United States Patent [19]
Trahan et al.

[11] Patent Number: 5,386,681
[45] Date of Patent: Feb. 7, 1995

[54] GARDENING TOOL FOR REMOVING WEEDS

[76] Inventors: Roger Trahan; Denise Gazaille, both of 924 route 116, Acton Vale, Quebec, Canada, J0H 1A0

[21] Appl. No.: 116,995

[22] Filed: Sep. 7, 1993

[51] Int. Cl.$^6$ ............................................. A01C 11/00
[52] U.S. Cl. ........................................ 56/239; 172/22
[58] Field of Search .............. 56/239; 171/11; 172/21, 172/22; 111/101; 294/49, 50.6, 50.7

[56] References Cited

U.S. PATENT DOCUMENTS

| | | |
|---|---|---|
| 235,463 | 12/1880 | Sidwell . |
| 466,207 | 12/1891 | Wells . |
| 576,703 | 2/1897 | Tyson . |
| 772,097 | 10/1904 | Hayes . |
| 933,227 | 9/1909 | Billau . |
| 959,003 | 5/1910 | Garwood ............................. 56/239 |
| 1,207,472 | 12/1916 | Barton . |
| 1,548,040 | 8/1925 | Johnson . |
| 1,888,170 | 11/1932 | Hornbaker . |
| 2,210,440 | 8/1940 | Avary . |
| 2,439,524 | 4/1948 | Moore . |
| 3,098,672 | 7/1963 | Husband . |
| 3,219,378 | 11/1965 | Padoshek . |
| 3,346,294 | 10/1967 | Sartz . |
| 3,865,055 | 2/1975 | Gilbaugh ......................... 172/22 X |
| 4,932,339 | 6/1990 | List .................................. 172/22 X |

FOREIGN PATENT DOCUMENTS

| | | |
|---|---|---|
| 2030154 | of 1992 | Canada . |
| 137681 | of 1930 | Switzerland . |
| 18856 | of 1891 | United Kingdom . |
| 8735 | of 1896 | United Kingdom . |
| 571737 | of 1945 | United Kingdom . |
| 610424 | of 1946 | United Kingdom . |
| 589237 | of 1947 | United Kingdom . |

*Primary Examiner*—Michael Powell Buiz
*Attorney, Agent, or Firm*—Robic

[57] ABSTRACT

A tool for use to remove weeds, especially dandelions, which comprises an open rectangular frame having an upper rod-like member defining a handle and a lower rod-like member of a length sufficient to receive the foot of an operator. This open rectangular frame gives room not only to the foot of the operator, but also to his or her knee, thereby making the tool much easier to use. The tool also comprises a tapered extraction tube externally secured to a lower lateral side of the frame. This particular positioning of the extraction tube is of particular importance, since, thanks to its eccentric position, a rotational force may be applied to it by both the hand and foot of the operator which holds the frame, respectively. Thanks to its structure, the taperated extraction tube is also self-cleaning, as it empties automatically when another plug of soil or earth containing a weed to be extracted is inserted therein. The tool further comprises a basket for collecting the plugs of earth or soil extracted with the extraction tube from the lawn or turf. This basket preferably has a flat bottom, an upstanding peripheral wall and a width substantially identical to the distance between the lateral members of the frame, thereby making snappable to the frame. The tool may further comprise penetration depth adjustment blocks removably attachable to the lower, footstep-defining member of the frame to limit the depth of penetration of the extraction tube into the lawn or turf.

17 Claims, 5 Drawing Sheets

GARDENING TOOL FOR REMOVING WEEDS

BACKGROUND OF THE INVENTION a) Field of the Invention

The present invention relates to a gardening tool for use to remove any kind of weeds from a lawn or turf even if this tool is more particularly designed for use to extract weeds having a tap root, such as dandelions. More particularly, the invention realtes to a gardening tool which is easy to operate and is very effective not only to extract weeds but also to collect the so extracted weeds, to aerate the ground and to make holes into this ground in order to plant bulbs.

b) Brief Description of the Invention

Manually operated tools for extracting weeds from lawns and turf are known in the art. One reason for which such tools have been devised and are still being used is that they obviate the need for pesticides if the lawn or turf does not have too many weeds growing thereon.

Most of the weed extracting tools known in the art basically comprises a shaft provided at one end with a handle and at the other end with a footrest and an extraction tube. Use of this tool is quite simple. The lower end of the tube is positioned around the stem of a weed to be extracted. Then, the tube is inserted into the ground by pressing on the handle or preferably only the footrest. Last of all, the tube containing a plug of earth or soil in which is embedded the root of the weed to be extracted is removed.

U.S. Pat. No. 2,439,524 issued to E. E. Moore on Apr. 13, 1948 discloses a "tubular hand garden weeder" having a handle at each end and a shaft joining the two. Extraction tubes of two different diameters are fixed to each end of the shaft, respectively. This tool is interesting in that its opposite tubes make it useful for extracting weeds of different sizes. However, nothing is provided for collecting the plugs of earth or soil that are extracted. Moreover, the way the tool is devised blocks the view of the top of the extraction tube when the operator looks down, thus making it difficult for the operator to precisely locate the tube over a weed.

U.S. Pat. No. 3,098,672 issued to Husband on Jul. 23, 1963 discloses a "turf plugger" designed to remove plugs of soil to aerate a turf. This device comprises a shaft provided with a handle at the upper end and with a combined step member and footrest at the other end, said combined step member and footrest being adjacent to an extraction tube and extending in the same direction as the handle. This tool is efficient and easy to use. However, one again nothing is provided for collecting the plugs of earth or soil that are extracted. Moreover, there is no way of adjusting the depth of penetration of the tube according to the sizes of the weeds to be extracted.

U.S. Pat. No. 3,219,378 issued to Padoshek on Nov. 23, 1965 discloses a "lawn perforator and weeder", comprising a straight shaft provided at one hand with a handle, and at the other end with a frusto-conical extraction tube. The latter is large enough to store a plurality of plugs but is very difficult to move around, because the tool only has a straight handle. Moreover, there is no way of adjusting the depth of penetration of the tube into the soil in use.

In Applicant's Canadian patent application No. 2,030,154 which was filed on Nov. 16, 1990 and laid-open to public inspection on May 18, 1992, and whose subject matter is incorporated herewith by reference, there is disclosed a tool for use to remove weeds, especially dandelions, which comprises an open rectangular frame having an upper rod-like member defining a handle and a lower rod-like member of a length sufficient to receive the foot of an operator. This open rectangular frame gives room not only to the foot of the operator, but also to his or her knee, thereby making the tool much easier to use. The tool also comprises a tapered extraction tube externally secured to a lower lateral side of the frame. This particular positioning of the extraction tube is of particular importance, since, thanks to its eccentric position, a rotational force may be applied to it by both the hand and foot of the operator which holds the frame, respectively. Thanks to its structure, the taperated extraction tube is also self-cleaning, as it empties automatically when another plug of soil or earth containing a weed to be extracted is inserted therein.

If the tool devised by the instant Applicants and described in their Canadian laid-open patent application No. 2,030,154 is much efficient in use than any other weed-extracting tools known to them, like those disclosed in the above mentioned U.S. patents, it still has the same deficiencies as the others, namely a lack of proper means for collecting the plugs of earth or soil that are extracted, and a lack of means for adjusting the depth of penetration of the weed-extracting tube, when the same is used to acrate the ground or to make holes to receive bulbs of plants or flowers.

OBJECTS AND SUMMARY OF THE INVENTION

The object of the present invention is to provide a tool for use to remove weeds from a lawn or turf, which tool is of the same type as disclosed in Applicant's canadian laid-open patent application no. 2,030,154, but which does not suffer from any of the deficiencies mentioned hereinabove.

Like the tool disclosed in Applicants'Canadian laid-open patent application no. 2,030,154, the tool according to the invention comprises a rectangular frame having an upper rod-like member, a lower rod-like member extending parallel to the upper member and a pair of parallel, spaced-apart lateral rod-like members joining the upper and lower members. The rectangular frame is of such a dimension that the upper member defines a handle and the lower member is wide enough to give room to the foot of an operator and thus to define a footstep. The lateral members of the frame are thus spaced apart at such a distance as to give room to the knee of the operator whose foot is on the foot step in use.

Like the tool disclosed in Applicant's canadian application no. 2,030,154, the tool according to the invention also comprises a tapered extraction tube externally secured to one of the lateral members of the frame adjacent the lower footstep defining member, for use to extract plugs of soil and earth in which are embedded the weeds to be removed. This extraction tube extends in a direction substantially parallel to the lateral member to which it is secured, and has an upper end of wider diameter and a lower end of narrower diameter projecting away from the lower footstep-defining member, this lower end having a piercing and cutting edge.

The tool according to the invention is characterized in that, in addition to the above structural elements, it further comprises a basket for collecting the plugs of earth or soil extracted with the extraction tube from the lawn or turf. This basket preferably has a flat bottom, an upstanding peripheral wall and a width substantially identical to the distance between the lateral members.

First attachment means are provided to removably attach the basket to the frame adjacent the upper end of the extraction tube in such a position as to receive and collect the plugs that are pushed in the extraction tube and fall out of the upper end of this tube when other plugs are being extracted.

Second attachment means are also provided to removably attach the basket to the frame between the lateral members of the same in such a position as to occupy a minimum of space when the tool is not in use.

In accordance with a preferred embodiment of the invention, the first attachment means comprises:

- a tube-receiving groove made in the peripheral wall of the basket at one end of the same, the groove extending perpendicularly to the bottom of the basket and being shaped and sized to receive and fit onto the upper end of the extraction tube,
- a retaining shoulder on top of the tube-receiving groove, the shoulder being sized and positioned in such a manner as, on the one hand, to abut on top of the upper end of the extraction tube when the groove of the basket is fitted into the tube, and thus to retain the basket in operative collecting position adjacent the tube, and, on the other hand, not to block the plugs pushed in the tube when the tool is used; and
- a pair of flanges projecting from the peripheral wall to define in between a slot extending adjacent and parallel to the tube receiving groove, this slot being sized to receive and fit around the lateral member to which the extraction tube is secured so as to prevent the basket from rotating about the extraction tube.

The basket may also comprise a curved guide tab projecting upwardly on top of the tube-receiving groove in the direction of the bottom of the basket so as to direct toward the basket the extracted plugs pushed out of the extraction tube.

In accordance with another preferred embodiment of the invention, the tool further comprises penetration depth adjustment means removably attachable to the lower, footstep-defining member of the frame to limit the depth of penetration of the extraction tube into the lawn or turf. This adjustment means preferably comprise at least one block-shaped element having a length substantially equal to the width of the lower member. This element has a top surface formed with a longitudinal groove sized to receive and snap-fit onto the lower member of the frame. The element also has an integral ring at one end, which is positioned, oriented and sized to receive and fit onto the extraction tube when the block-shaped element is snapfitted onto the lower rod-like member.

Each element may further have a bottom surface formed with a longitudinal rod-like rim sized to be received and snap fitted into the longitudinal groove of another similar element, whereby two or more block-shaped elements can be detachably connected to each other to reduce the depth of penetration of the tube according to the operator's need, as the thickness of each element serves to shorten the penetration depth of the extraction tube as it penetrates into the ground. This permits to control the depth of the holes made with the extraction tube into the ground, when the tool is just used to acrate the ground or to make holes for planting bulbs.

More generally, in accordance with the invention, there is provided is a tool for use to remove weeds from a lawn or turf, which comprises, in combination:

a) a frame having an upper rod-like member defining a handle and a lower rod-like member defining a footstep;

b) a weed-extraction tube secured to the frame at a lower lateral portion thereof, the tube projecting in such a manner as to allow extraction of plugs of soil and earth in which are embedded the weeds to be removed;

c) a basket for collecting the plugs of earth or soil extracted with the extraction tube;

d) first attachment means to removably attach the basket to the frame adjacent the extraction tube in such a position as to collect the plugs that are pushed into and fall out of the tube when other plugs are being extracted;

e) second attachment means to removably attach the basket to the frame in such a position as to occupy a minimum of space when the tool is not in use; and f) if desired, penetration depth adjustment means attachable to the lower rod-like member to limit the depth of penetration of the extraction tube into the lawn of turf, in use.

The tool according to the invention is very simple in structure and not expensive to produce. It is also very easy to use to remove various weeds from a lawn. This tool is very practical and has the supplemental essential features of being very amenable to packaging for sale, compact storage and obviation of the occurrence of lost parts.

BRIEF DESCRIPTION OF THE DRAWINGS

The invention and its numerous advantages will be better understood upon reading of the following, non-restrictive description of a preferred embodiment thereof, given with reference to the accompanying drawings in which.

DESCRIPTION OF A PREFERRED EMBODIMENT

Figure 1:
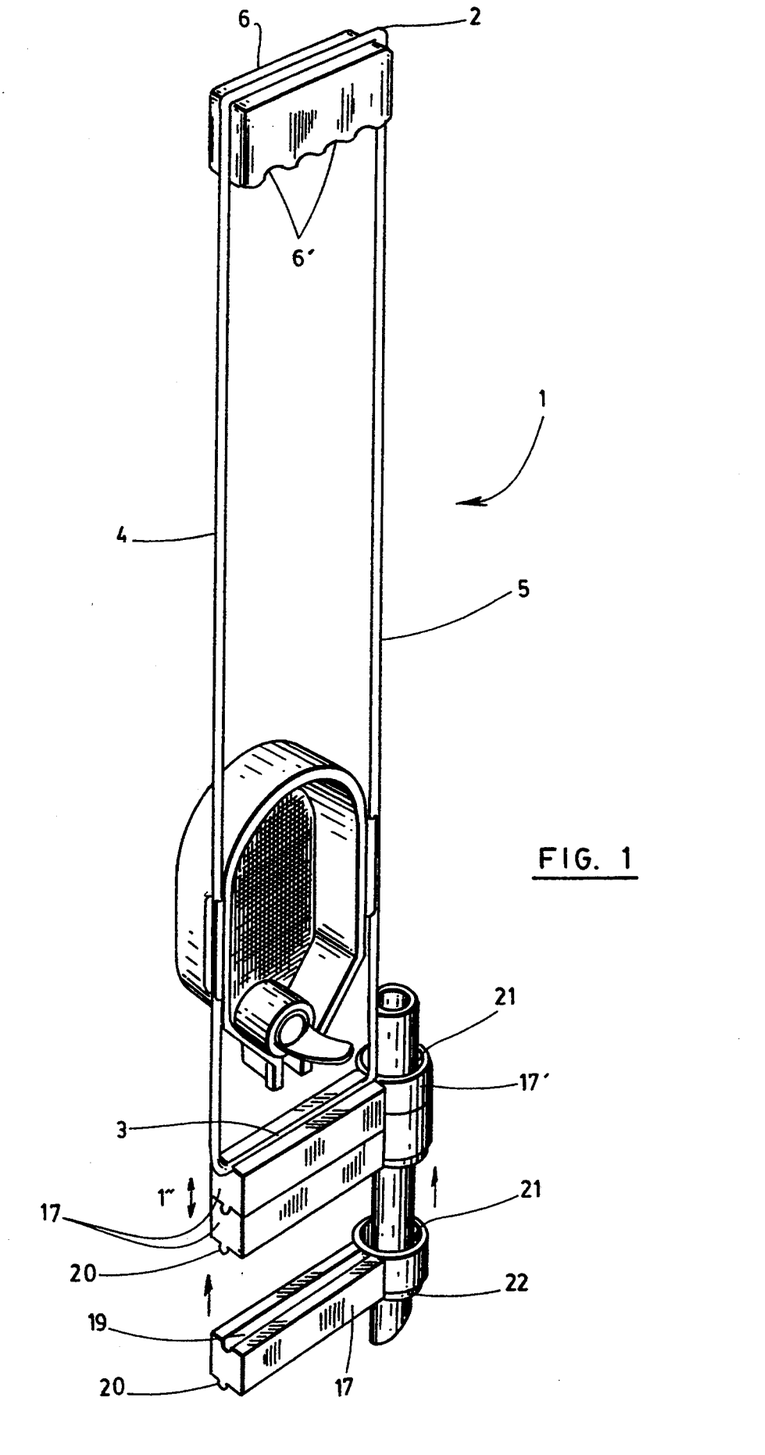
FIG. 1 is a perspective view of a tool according to the invention.

The tool 1 according to the invention as shown in FIG. 1, comprises an elongated rectangular frame having an upper rod-like member 2, a lower rod-like member 3 extending parallel to the upper member, and a pair of parallel, spaced-apart lateral rod-like members 4, 5 joining the upper and lower members. The rectangular frame which is preferably made of steel, has a dimension selected so that its upper member 2 defines a handle and its lower member 3 is wide enough to give room to the foot of an operator and thus to define a footstep. The lateral members 4, 5 of the frame are thus spaced apart at such a distance as to give room to the knee of the operator whose foot is on the footstep.

Advantageously, a large handle grip 6 is secured to the upper rod-like member 2. This handle grip 6 is preferably molded of plastic material and provided with grooves sized to snap-fit onto the rod-like members 2, 4 and 5, as is shown. It is also preferably formed with finger-receiving grooves 6' to make it easier to grasp.

Figure 2:
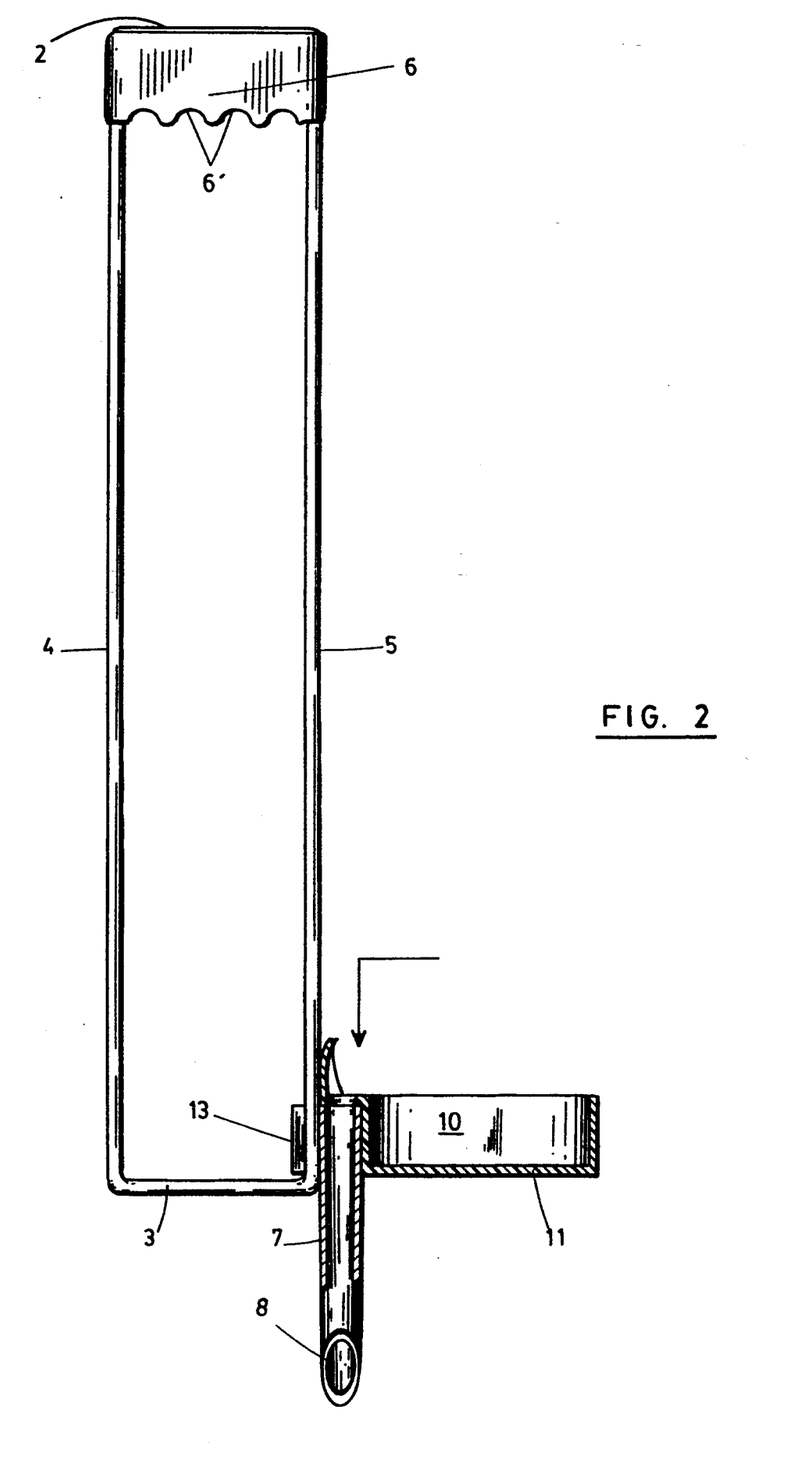
FIG. 2 is a front elevational view of the tool of FIG. 1, showing the basket and a portion of the extraction tube in cross-section.
Figure 3:
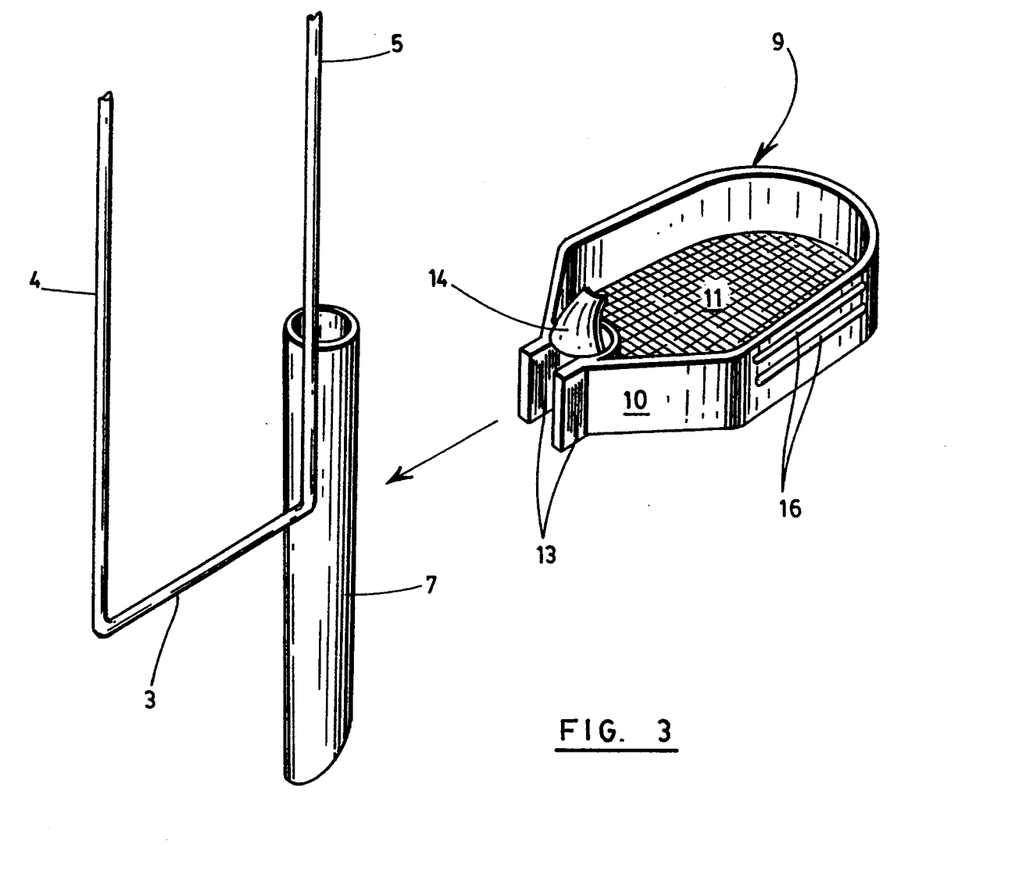
FIG. 3 is another perspective view of the lower part of the frame and the basket of the tool of FIG. 1, the arrow indicating where the basket is to be attached to the frame.
Figure 4:
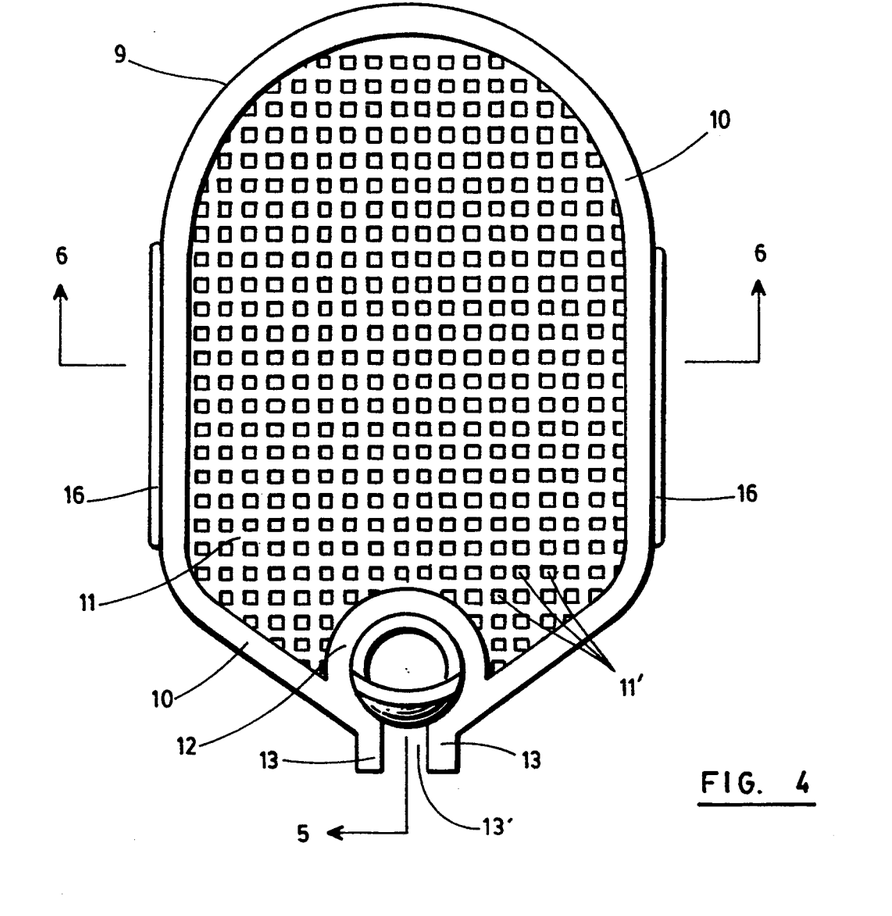
FIG. 4 is a top plan view of the basket.
Figure 5:
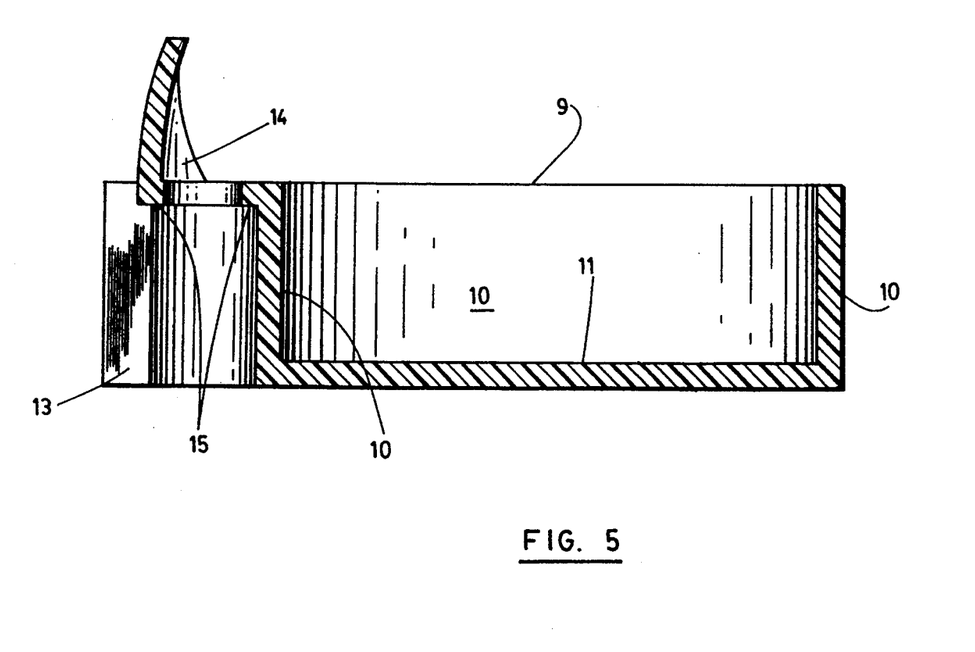
FIGS. 5 and 6 are cross-sectional views taken along lines V—V and VI—VI of FIG. 4, respectively.
Figure 6:
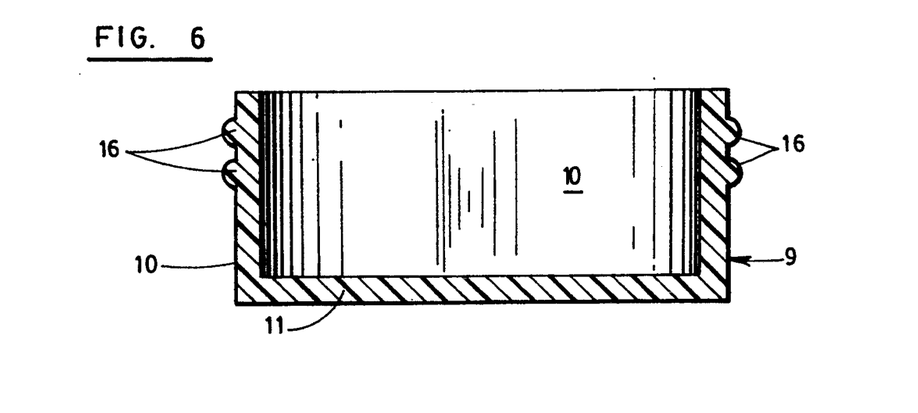

As is better shown in FIGS. 2 and 3, the tool 1 also comprises a tapered extraction tube 7 externally secured to the lateral member 5 of the frame adjacent the lower footstep-defining member 3. This tube is intended to be used to extract plugs of soil and earth in which are embedded the weeds to be removed. This extraction tube 7 extends in a direction substantially parallel to the lateral member 5 and has an upper end of wider diameter and a lower end 8 of narrower diameter that projects away from the lower member 3. Preferably, the tube 7 is conical and has a sharpened lower end defining a piercing and cutting edge.

This particular positioning and shape of the extraction tube 7 allows an operator to look down, to see its lower end 8 and thus to properly position the tube around the stem of the weed to be uprooted.

In accordance with the invention, the tool 1 further comprises a basket 9 for use to collect the plugs of earth or soil extracted with the extraction tube from the lawn or turf. As is better shown in FIGS. 3 to 6, the basket 9 is preferably made of plastic material and comprises a peripheral wall 10 and a bottom 11 which is preferably provided with perforations 11' and thus formed as a screen. This basket is adapted to receive and collect a plurality of roots while allowing the earth to fall through the perforations 11'.

First attachment means are provided to removably attach the basket 9 to the frame adjacent the upper end of the extraction tube 7 in such a position as to receive and collect the plugs that are pushed into the tube and fall out of the upper end of this tube when other plugs are being extracted. This first attachment means may consist of a metal clip that projects from the peripheral wall 10 of the basket and snappable onto the extraction tube. However, as is shown in the drawing, the first attachment means preferably comprises of plurality of structural elements integral with the basket, including a tube-receiving groove 12, a retaining shoulder 15 and a pair of flanges 13.

The tube-receiving groove 12 is made in the peripheral wall 10 at one end of the basket. This groove extends perpendicularly to the bottom of the basket and is shaped and sized to receive and fit onto the upper end of the extraction tube 7. The retaining shoulder 15 extends on top of the tube-receiving groove 12. This shoulder 15 is sized and positioned in such a manner as to abut on top of the upper end of the extraction tube 7 when the groove 12 of the basket is fitted onto this tube. The purpose of the shoulder 15 is to retain the basket in operative collecting position adjacent the tube 7, with the bottom 11 of the basket extending above or in the same horizontal plane as the lower member 3. The shoulder is also sized and positioned not to block the plugs pushed into the tube 7 when the tool is used. The flanges 13 projects from the peripheral wall 10 to define in between a slot 13' extending adjacent and parallel to the tube-receiving grove 12. This slot 13' is equal in width to the thickness of the lateral member 5 so as to receive and fit around this lateral member 5 and thus to prevent the basket in use from rotating about the extraction tube 7.

Advantageously, the basket 9 also comprises a curved guide tab 14 projecting upwardly on top of the tube-receiving groove 12 in the direction of the bottom 11 of the basket so as to direct toward this basket the extracted plugs pushed out of the extraction tube.

Second attachment means are also provided to removably attach the basket 9 to the frame between the lateral members 4, 5 in such a position as to occupy a minimum of space when the tool is not in use.

Once again, the second attachment means may consist of a clip projecting from the basket and snappable onto one of the lateral members 4, 5 of the frame. Advantageously, however, when the peripheral wall 10 of the basket 9 has two opposite portions that are parallel to each other and symmetrical with respect to the one end of the basket where the tube-receiving groove is located, and when these opposite portions are spaced apart at a distance similar to the one between the lateral members 5, 6 as is shown, the second attachment means preferably comprises a pair of outwardly projecting beads 16 on each of the opposite portions. The beads 16 that are preferably elongated and extend parallel to the bottom 11 of the basket, are spaced apart so as to snugly receive the corresponding lateral rod-like member 5, 6 of the frame, whereby the basket can be snap-fitted between the lateral rod-like members 5, 6 of said frame in a very compact space-saving manner when the tool is not in use.

Use of the tool 1 disclosed hereinabove is quite simple. The operator grasps with one or both hands the handle 6 and places a foot on the lower member 3. Then, he or she locates the extraction tube 7 around a weed stem, pushes it into the ground and finally gives it a twisting motion to cut the weed to be extracted if it is longer than the tube 7. The resulting plug enters the extraction tube 7 and is guided into the basket 10 as a second plug enters the tube 7.

In accordance with another aspect of the invention, the tool 1 may also comprises penetration depth adjustment means removably attachable to the lower, footstep-defining member 3 of the frame to limit the depth of penetration of the extraction tube 7 into the lawn or turf. As is shown, the adjustment means comprises a plurality of block-shaped elements 17 having a length substantially equal to the width of the lower member 3. Each element 17 has a top surface formed with a longitudinal groove 19 sized to receive and snap-fit onto the lower member 3 of the frame. Each element 17 also has an integral ring at one end, which comprise an upper recessed rim 21 and a lower annular shoulder 22. The ring is positioned oriented and sized to receive and fit onto the extraction tube 7 when the block-shaped element 17 is snap-fitted onto the lower rod-like member. Each element 17 may further have a bottom surface formed with a longitudinal rod-like rib 20 sized to be received and snap fitted into the longitudinal groove 19 of another element 17. Thus, in use, two or more block-shaped elements 17 can be detachably connected to each other to reduce by their thicknesses the depth of penetration of the extraction tube 7.

Of course, the block-shaped elements 17 may be snap-fitted to the lower member 3 of the frame as discribed above to put them away in a safe, space-saving manner when the tool is not in use.

As aforesaid, the gardening tool 1 has numerous advantages.

First of all, thanks to the rectangular shape of its frame, there is no risk for the foot of the operator to slide out of the footrest member in use. As a result, the apparatus is very safe in use. The fact that there is a large handle grip is also quite interesting since it allows the tool to be easily grasped and used with only one hand.

The rectangular frame is also useful in that it allows the knee of the operator to move between the lateral rod-like member applying the requested pressure onto the footrest member.

As already explained hereinabove, the fact that the extraction tube is adjacent to the rectangular frame is also very interesting, since it allows the operator to look down at it, to see the lower end of this tube and thus to properly position this tube around the stem of the weed to be extracted. The fact that the lower end of the extraction tube has a piercing and cutting edge, is also interesting in that it makes the weed extraction much easier and efficient.

The fact that there is a basket is also very advantageous because:

1—it avoids the accumulation of the extracted roots onto the lawn or turf,

2—it avoids the operator to lean forward after each extraction to collect the corresponding weed;

3—the fact that the basket is easily removable makes it easy to empty;

4—the fact that the basket can be removably attached between the lateral rod-like members of the frame is also particularly interesting in that it permits to store it and put it away in a very easy manner. Such an easy storage also makes the tool very easy to package for sale.

Last of all, the fact that the penetration depth of the tube can be adjusted is very advantageous, because it permits to control the depth of the holes made with the extraction tube inbto the ground when the tool is used to make holes to acrate the ground or to plant bulbs.

Of course, nemerous other modifications could be made to the gardening tool described hereinabove, without departing from the scope of the invention as defined in the appended claims.

We claim:

1. A tool for use to remove weeds from a lawn or turf, said tool comprising, in combination:

a) a rectangular frame having an upper rod-like member, a lower rod-like member extending parallel to the upper member and a pair of parallel, spaced-apart lateral rod-like members joining said upper and lower members, said rectangular frame being of such a dimension that its upper member defines a handle and its lower member is wide enough to give room to the foot of an operator and thus to define a footstep, the lateral members of the frame being spaced apart at such a distance as to give room to the knee of the operator whose foot is on the footstep;

b) a tapered extraction tube externally secured to one of the lateral members of the frame adjacent the lower footstep defining member for use to extract plugs of soil and earth in which are embedded the weeds to be removed, said extraction tube extending in a direction substantially parallel to the lateral member to which it is secured and having an upper end of wider diameter and a lower end of narrower diameter projecting away from said lower member, said lower end having a piercing and cutting edge; and c) a basket for collecting the plugs of earth or soil extracted with the extraction tube from the lawn or turf, said basket having a width substantially identical to the distance between the lateral members and comprising:

first attachment means to removably attach the basket to the frame adjacent the upper end of the extraction tube in such a position as to receive and collect the plugs that are pushed in the extraction tube and fall out of the upper end of said tube when other plugs are being extracted; and second attachment means to removably attach the basket to the frame between the lateral members of the same in such a position as to occupy a minimum of space when the tool is not in use.

2. The tool of claim 1, wherein said basket comprises a flat bottom and an upstanding peripheral wall and wherein said first attachment means comprises:

a tube-receiving grove made in said peripheral wall at one end of said basket, said groove extending perpendicularly to said bottom and being shaped and sized to receive and fit onto the upper end of the extraction tube, a retaining shoulder on top of said tube-receiving groove, said shoulder being sized and positioned in such a manner as, on the one hand, to abut on top of the upper end of the extraction tube when the groove of the basket is fitted onto said tube, and thus to retain said basket in operative collecting position adjacent said tube, and, on the other hand, not to block said plugs pushed in said tube when the tool is used; and a pair of flanges projecting from said peripheral wall to define in between a slot extending adjacent and parallel to the tube receiving groove, said slot being sized to receive and fit around the lateral member to which the extraction tube is secured so as to prevent the basket in use from rotating about the extraction tube.

3. The tool of claim 2, wherein said basket also comprises a curved guide tab projecting upwardly on top of said tube-receiving groove in the direction of the bottom of said basket so as to direct toward said basket the extracted plugs pushed out of the extraction tube.

4. The tool of claim 3, wherein the upstanding peripheral wall of said basket has two opposite portions that are parallel to each other and symmetrical with respect to the one end of the basket where said tube receiving groove is located, said opposite portions defining together the width of said basket, and wherein said second attachment means comprises a pair of outwardly projecting beads on each of said opposite portions, said beads being so spaced apart as to snugly receive the corresponding lateral rod-like member of the frame, whereby said basket can be snap-fitted between the lateral rod-like members of said frame to occupy a minimum of space when the tool is not in use.

5. The tool of claim 4, wherein the beads are elongated and extend parallel to the bottom of said basket.

6. The tool of claim 5, wherein the flat bottom of said basket is provided with perforations and thus formed as a screen.

7. The tool of claim 6, further comprising:

a large handle grip secured to said upper rod-like member, said handle grip having finger receiving grooves formed in it.

8. The tool of claim 1, further comprising:
d) penetration depth adjustment means removably attachable to the lower, footstep-defining member of the frame to limit the depth of penetration of said extraction tube into the lawn or turf, said adjustment means comprising at least one block-shaped element having a length substantially equal to the width of said lower member, said element having a top surface formed with a longitudinal groove sized to receive and snap-fit onto the lower member of said frame, said element also having an integral ring at one end, said ring being positioned, oriented and sized to receive and fit onto the extraction tube when said block-shaped element is snap-fitted onto the lower rod-like member.

9. The tool of claim 8, wherein said penetration depth adjustment means comprises a plurality of said block-shaped elements, each of said elements having a bottom surface formed with a longitudinal rod-like rim sized to be received and snap fitted into the longitudinal groove of another one of said elements, whereby two or more of said plurality of block shaped elements can be detachably connected to each other to reduce the depth of penetration of the tube according to the operator's need.

10. The tool of claim 9, further comprising:
a large handle grip secured to said upper rod-like member said handle grip having finger receiving grooves formed in it.

11. The tool of claim 4, further comprising:
d) penetration depth adjustment means removably attachable to said lower, footstep-defining member of the frame to limit the depth of penetration of said extraction tube into the lawn or turf, said adjustment means comprising at least one block-shaped element having a length substantially equal to the width of said lower member, said element having a top surface formed with a longitudinal groove sized to receive and snap-fit onto the lower member of said frame, said element also having an integral ring at one end, said ring being positioned, oriented and sized to receive and fit onto the extraction tube when said block-shaped element is snap-fitted onto the lower rod-like member.

12. The tool of claim 11, wherein said penetration depth adjustment means comprises a plurality of said block-shaped elements, each of said elements having bottom surface formed with a longitudinal rod-like rib sized to be received and snap fitted into the longitudinal groove of another one of said elements, whereby two or more of said plurality of block shaped elements can be detachably connected to each other to reduce the depth of penetration of the tube according to the operator's need.

13. The tool of claim 12, further comprising:
a large handle grip secured to said upper rod-like member said handle grip having finger receiving grooves formed in it.

14. The tool of claim 13, wherein the flat bottom of said basket is provided with perforation and thus formed as a screen.

15. The tool as defined in claim 14, wherein said extraction tube is conical and has a sharpened lower end.

16. A tool for use to remove weeds from a lawn or turf, said tool comprising, in combination:
a) a frame having an upper rod-like member defining a handle and a lower rod-like member defining a foot-step;
b) a weed-extraction tube secured to said frame at a lower lateral portion thereof, said tube projecting in such a manner as to allow extraction of plugs of soil and earth in which are embedded the weeds to be removed;
c) a basket for collecting the plugs of earth or soil extracted with the extraction tube;
d) first attachment means to removably attach said basket to said frame adjacent said extraction tube in such a position as to collect the plugs that are pushed in and fall out of said tube when other plugs are being extracted; and
e) second attachment means to removably attach the basket to the frame in such a position as to occupy a minimum of space when the tool is not in use.

17. The tool of claim 16, further comprising:
f) penetration depth adjustment means attachable to said lower rod-like member to limit the depth of penetration of said extraction tube into the lawn of turf, in use.

* * * * *